United States Patent
Pistorino et al.

(10) Patent No.: US 9,450,272 B2
(45) Date of Patent: Sep. 20, 2016

(54) SMALL DOMAIN-SIZE MULTIBLOCK COPOLYMER ELECTROLYTES

(71) Applicants: Jonathan Pistorino, Oakland, CA (US); Hany Basam Eitouni, Oakland, CA (US)

(72) Inventors: Jonathan Pistorino, Oakland, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 259 days.

(21) Appl. No.: 13/862,442

(22) Filed: Apr. 14, 2013

(65) Prior Publication Data
US 2013/0273419 A1     Oct. 17, 2013

Related U.S. Application Data

(60) Provisional application No. 61/624,253, filed on Apr. 14, 2012.

(51) Int. Cl.
H01M 10/0562    (2010.01)
H01M 6/18        (2006.01)
H01M 10/0565    (2010.01)
H01M 10/052      (2010.01)

(52) U.S. Cl.
CPC ....... *H01M 10/0565* (2013.01); *H01M 10/052* (2013.01); *Y02E 60/122* (2013.01)

(58) Field of Classification Search
USPC ................. 429/306, 304, 305, 309
IPC .................. H01M 10/0565,6/18, 6/181, 6/185, H01M 6/187
See application file for complete search history.

(56) References Cited

U.S. PATENT DOCUMENTS 6,361,901 B1 * 3/2002 Mayes et al. ............... 429/309
6,855,433 B1    2/2005 Meador et al.
2005/0221193 A1 10/2005 Kinouchi et al.
2008/0113244 A1 * 5/2008 Yamashita et al. ............ 429/33
2009/0075176 A1  3/2009 Singh et al.
2009/0263725 A1 10/2009 Balsara et al.

FOREIGN PATENT DOCUMENTS

WO    2011020073 A1    2/2011
WO    2011146669 A1    11/2011

OTHER PUBLICATIONS

Buriez, et al, "Performance limitations of polymer electrolytes based on ethylene oxide polymers," Journal of Power Sources 89 2000, 149-155.
Singh, et al, "Effect of Molecular Weight on the Mechanical and Electrical Properties of Block Copolymer Electrolytes," Macromolecules 2007, 40, 4578-4585.
Spontak, et al, "Perfectly-Alternating Linear (AB)n Multiblock Copolymers: Effect of Molecular Design on Morphology and Properties," Journal of Polymer Science: Part B: Polymer Physics, vol. 39, 947-955 (2001).
Chenchen Xue, "Morphology of PI-PEO block copolymers for lithium batteries," Polymer 47 (2006) 6149-6155.
Mary Ann B. Meador, "Effect of Branching on Rod-Coil Block Polyimides as Membrane Materials for Lithium Polymer Batteries," Chem. Mater. 2003, 15, 3018-3025.

\* cited by examiner

*Primary Examiner* — Patrick Ryan
*Assistant Examiner* — Julian Anthony
(74) *Attorney, Agent, or Firm* — R'Sue Popowich Caron

(57) ABSTRACT

New block polymer electrolytes have been developed which have higher conductivities than previously reported for other block copolymer electrolytes. The new materials are constructed of multiple blocks (>5) of relatively low domain size. The small domain size provides greater protection against formation of dendrites during cycling against lithium in an electrochemical cell, while the large total molecular weight insures poor long range alignment, which leads to higher conductivity. In addition to higher conductivity, these materials can be more easily synthesized because of reduced requirements on the purity level of the reagents.

12 Claims, 5 Drawing Sheets

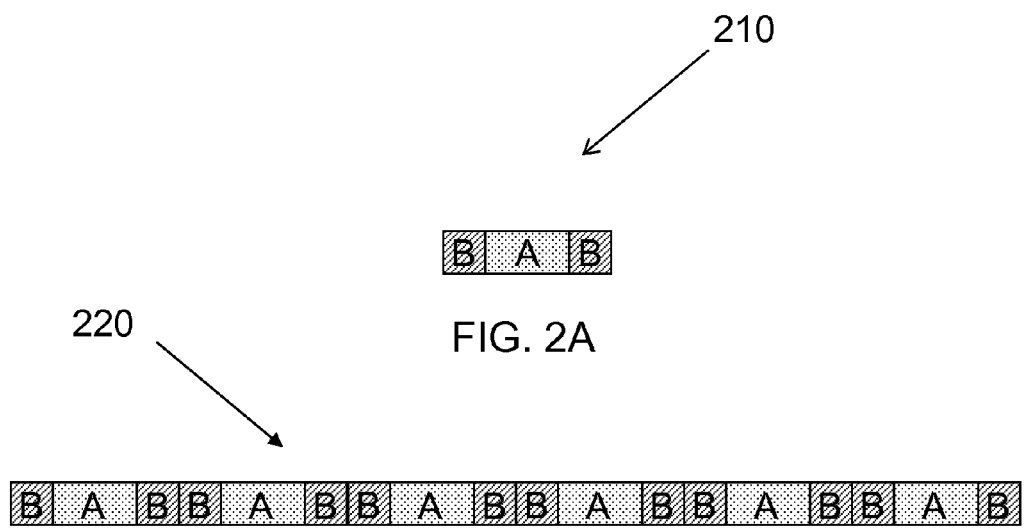
FIG. 2A
FIG. 2B
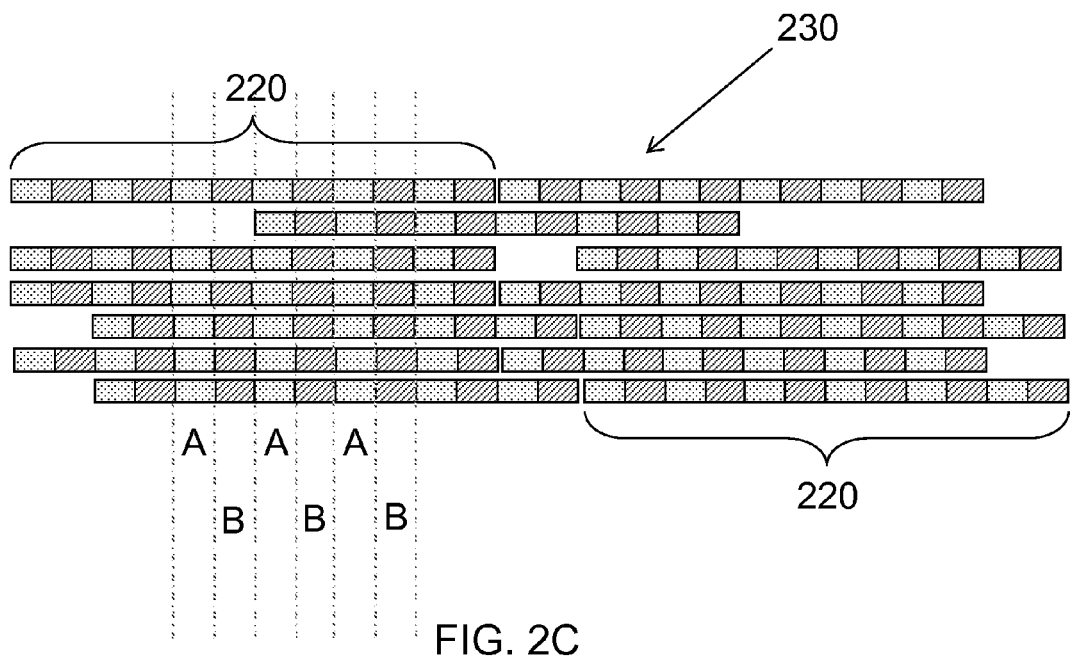
FIG. 2C

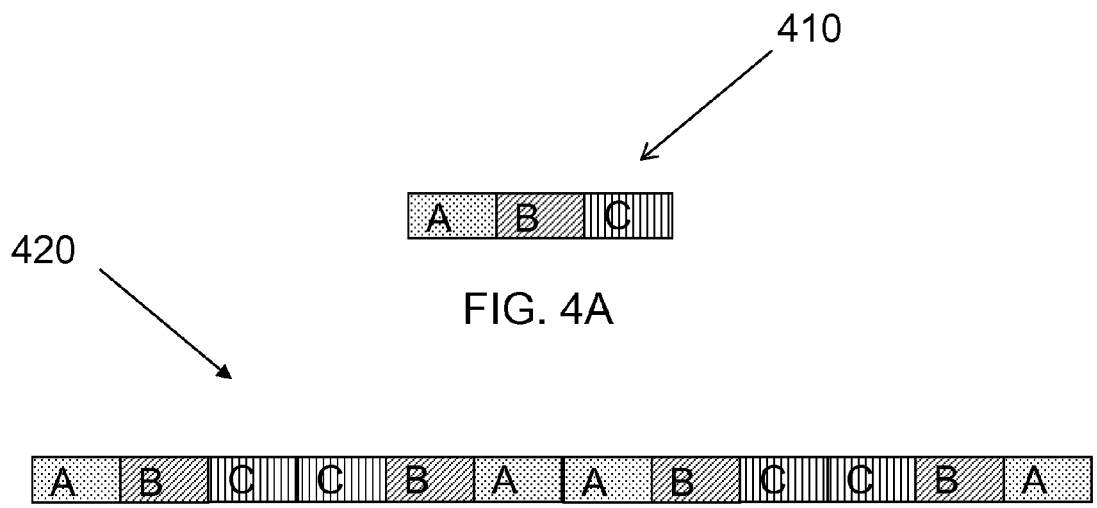
FIG. 4A
FIG. 4B
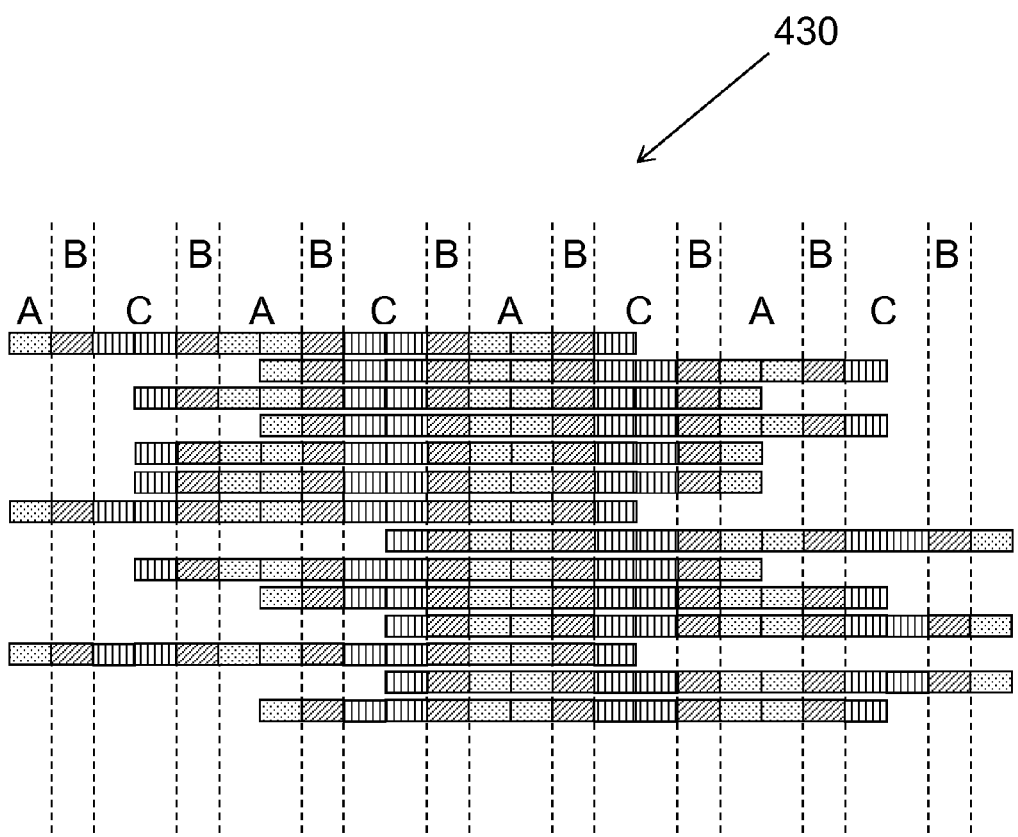
FIG. 4C

SMALL DOMAIN-SIZE MULTIBLOCK COPOLYMER ELECTROLYTES

CROSS-REFERENCE TO RELATED APPLICATIONS

This application claims priority to U.S. Provisional Patent Application 61/624,253, filed Apr. 14, 2012, which is incorporated by reference herein.

STATEMENT OF GOVERNMENT SUPPORT

The invention described and claimed herein was made in part utilizing funds supplied by the U.S. Department of Energy under Contract No. DE-OE0000223. The Government has certain rights in this invention

BACKGROUND OF THE INVENTION

Field of the Invention

This invention relates generally to electrolytes for electrochemical cells, and, more specifically, to block copolymer electrolytes that have both high conductivity and enough hardness to prevent formation of dendrites when cycled against lithium and are simple to synthesize.

It has been shown that polymer electrolytes comprising alternating hard and soft domains on the nanometer length scale can provide adequate conductivity and excellent cycling stability against Li metal anodes in electrochemical cells. Such nanometer-scale ordered structures have been formed by copolymers of soft polymers, which provide ionic conduction, and hard polymers, which provide mechanical integrity.

While maintaining a desired volume ratio of hard to soft domains, optimal conductivities have been obtained through control over the size and orientation of the alternating domains. Geometric factors, such as domain size and degree of long range alignment of the domains, can be altered by changing the architecture of the copolymers which comprise the hard and soft domains.

In general, polymers with higher molecular weights have better mechanical properties. This is especially true for block copolymers. When high molecular weight block copolymers are made using conventional methods, the size of the domains comprising the different blocks can be very large, greater than about 100 nm. A small amount of initiator is used relative to the amounts of monomers to ensure that the reaction yields fewer high molecular weight (i.e., long) chains rather than more low molecular weight (i.e., short) chains. High purity is especially critical in making high molecular weight polymers, as a smaller amount of initiator (smaller than for making low molecular weight polymers) is used when higher molecular weights are desired. But impurities in the mixture can terminate the reactions before the desired molecular weights are reached.

For high molecular weight polymers, there is a lot more chain entanglement with neighboring polymer molecules than there is for low molecular weight polymers. While this leads to superior mechanical toughness on the macroscopic scale, these entanglements limit molecular mobility and can cause poor self-assembly and reduced long-range alignment of phase-separated domains. Conversely, low molecular weight block copolymers have few or no entanglements and thus have higher molecular mobility to assemble into phase-separated domains that have good long-range alignment over many consecutive domains. It seems that poor long-range alignment is a contributing factor to good conductivity, so it has been most desirable to use high molecular weight polymers when making materials to use as electrolytes. When block copolymers are used to make electrolytes, high molecular weight block copolymer chains with very large blocks (on the order of 200,000 Daltons or more) have been used to make materials with very large domains. It has been assumed that large blocks and high molecular weight are coupled, and thus that very large domains are desirable for high conductivity. Yet, for high molecular weight block copolymer materials, the effect of domain size on conductivity has not been well understood, and there has been no independent control over domain size with respect to total molecular weight in these materials.

It would be useful to be able to optimize both conductivity and mechanical properties through independent control over molecular weight, domain size, and long range alignment of block copolymer electrolytes and to have a method of making such block copolymer electrolytes that is not so critically dependent on extreme purity.

BRIEF DESCRIPTION OF THE DRAWINGS

The foregoing aspects and others will be readily appreciated by the skilled artisan from the following description of illustrative embodiments when read in conjunction with the accompanying drawings.

FIG. 2A is a schematic illustration of a low molecular weight triblock copolymer molecule that has small blocks.

FIG. 2B is a schematic illustration of a high molecular weight block copolymer molecule made by stringing together the low molecular weight block copolymer molecules shown in FIG. 2A.

FIG. 2C is a schematic illustration of a high molecular weight block copolymer material that is made from the molecules in FIG. 2B and has small domains despite having high molecular weight, according to an embodiment of the invention.

FIG. 4A is a schematic illustration of a low molecular weight triblock copolymer molecule that has small blocks.

FIG. 4B is a schematic illustration of a high molecular weight block copolymer molecule made by stringing together the block copolymer molecules shown in FIG. 4A.

FIG. 4C is a schematic illustration of a high molecular weight block copolymer material that is made from the molecules in FIG. 4B and has small domains despite having high molecular weight, according to an embodiment of the invention.

SUMMARY

Figure 1A:
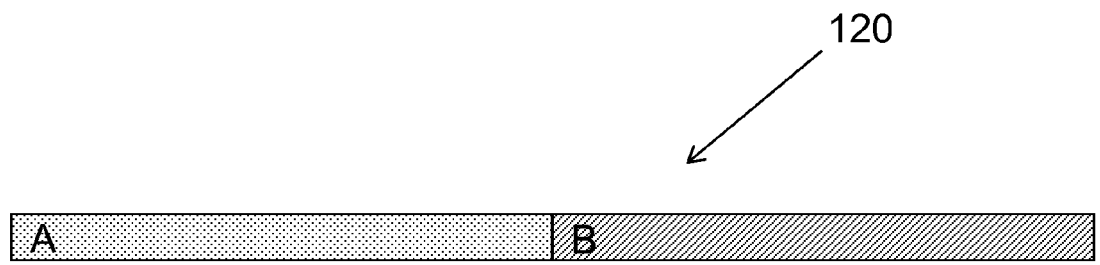
FIG. 1A is a schematic illustration of a high molecular weight block copolymer molecule that has large blocks.

In one embodiment of the invention, a linear block copolymer electrolyte is provided. The block copolymer is made from a plurality of linear polymer chains having molecular weights greater than about 100,000 Daltons, and each chain spans a plurality of contiguous lamellar domains. A first lamellar domain comprises a plurality of first linear polymer blocks that have molecular weights between about 500 and 10,000 Daltons and a salt, and it is a conductive portion of the electrolyte material. A second lamellar domain comprises a plurality of second linear polymer blocks that have molecular weights between about 500 and 10,000 Daltons. The second lamellar domain is adjacent to the first lamellar domain and is a structural portion of the electrolyte material.

In one embodiment of the invention, polyethylene oxide (PEO) is used as the conductive block. The PEO can be synthesized from ethylene oxide that has purity between about 98 and 99.5%.

In one embodiment of the invention, polystyrene (PS) is used as the structural block. The PS can be synthesized from styrene that has purity between about 95 and 99.5%.

In one embodiment of the invention the block copolymer electrolyte has an ionic conductivity of at least $1\times10^{-5}$ Scm$^{-1}$ at 90° C.

In another embodiment of the invention, a method of synthesizing a block copolymer electrolyte is provided. The method involves forming individual block copolymer chains that have a first ionically conductive block and a second structural block. Each block has a molecular weight between about 250 and 10,000 Daltons. The individual block copolymer chains are allowed to join together to form a larger block copolymer molecule with a molecular weight greater than about 100,000 Daltons. A salt, such as a lithium salt is added to the block copolymer.

DETAILED DESCRIPTION

The preferred embodiments are illustrated in the context of polymer electrolytes for lithium battery cells. The skilled artisan will readily appreciate, however, that the materials and methods disclosed herein will have application in a number of other contexts where ionic conduction in solid polymers is desirable, particularly where ease of synthesis is important.

All publications referred to herein are incorporated by reference in their entirety for all purposes as if fully set forth herein.

The molecular weights given herein are weight-averaged molecular weights.

Reference will now be made to the drawings wherein like numerals refer to like parts throughout.

There are many methods that can be used to synthesize block copolymer electrolytes. One example is living anionic polymerization. Monomers of a conductive polymer block are added to a living anionic polymerization mixture of structural polymer block molecules. The monomers attach to the end of the structural polymer molecules and grow into long block copolymer chains. It is important to maintain very high purity in the anionic polymerization as impurities can bond to chain ends and prevent additional monomers from attaching themselves. Thus, impurities can stop the reaction before desirable molecular weights are achieved. In the absence of significant impurities, the reaction may proceed to completion and then be terminated with a suitable reagent. The reaction occurs as desired only under very controlled conditions, making industrial synthesis of high molecular weight block copolymers difficult and costly.

Other methods of synthesizing block copolymer electrolytes, such as cationic polymerization, reactive blending, and controlled radical polymerization are also complicated in their own ways, again, making such processing expensive. Additionally, these polymerization techniques can themselves introduce impurities into the system which may have undesirable effects on the polymer and/or on the final application. These synthesis methods are subject to similar constraints regarding impurities and the ability to achieve high molecular weight polymers.

Figure 1B:
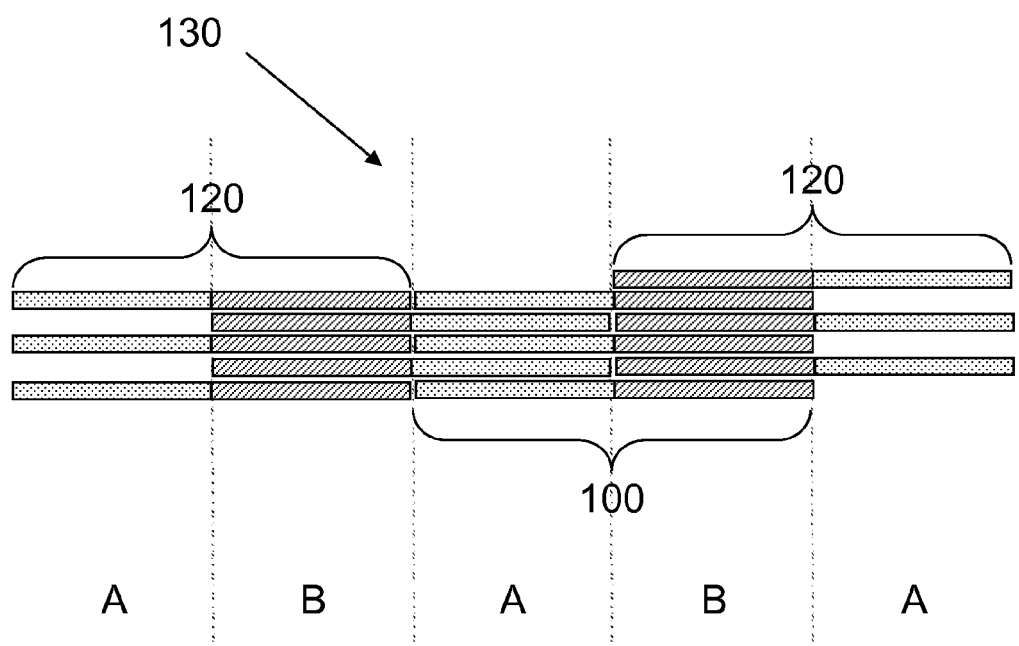
FIG. 1B is a schematic illustration of a high molecular weight block copolymer material that is made from the molecules in FIG. 1A and has large domains.

An example of a block copolymer electrolyte 120 made using any of the methods described above is shown in FIG. 1A. The block copolymer electrolyte 120 has an A block that provides mechanical strength and a B block that is ionically conductive. The molecular weights of the A block and the B block are generally between about 50,000 and 500,000 Daltons, yielding an overall molecular weight for the block copolymer of between about 100,000 and 1,000,000 Daltons. As shown in FIG. 1B, the block copolymer molecules 120 can self-assemble to form a domain structure 130. For clarity, a few individual block copolymer molecules are labeled as 120. Thus the overall material has a lamellar domain structure with alternating domains of A (structural) material and B (conductive) material. The domain sizes are determined by the molecular weights of the A and B blocks.

A new method of synthesizing high molecular weight block copolymer electrolytes has been developed. It is now possible to synthesize high molecular weight block copolymers using monomers with less purity than has been possible before. Total molecular weight and domain size are decoupled, making it possible to adjust domain size and long range domain ordering independently to develop optimal characteristics. This has implications, not only on optimal copolymer architecture for achieving maximum conductivity, but also on the synthetic method and ultimate cost of such optimized electrolyte materials. In addition, the synthesis is relatively unaffected by small impurities found in the starting monomers used to grow the polymers. Block copolymer electrolytes that have been synthesized using the methods and materials disclosed herein have been found to have higher conductivity and better dendrite suppression than previous block copolymer electrolytes made using equally impure, low-cost reagents.

In one embodiment of the invention, synthesis of block copolymer electrolytes is a two-step process. In the first step small diblock or triblock (or any multiblock) copolymer chains are made. The chains are then joined together to form long chains of alternating blocks. Although the molecular weights of the blocks are small, the overall molecular weights of the long chains are very large.

High molecular weight block copolymers with small domain sizes can be understood with reference to FIGS. 2A, 2B, and 2C, according to an embodiment of the invention. FIG. 2A is a schematic illustration of a block copolymer molecule 210 that has been made using the process described herein. The molecule 210 is a very small block copolymer chain that has a block A (structural) attached to smaller blocks B (conductive) on either side. Block A has a molecular weight between about 500 and 10,000 Daltons. Each smaller block B has a molecular weight between about 250 and 5,000 Daltons. As shown in FIG. 2B, multiple blocks (e.g., more than five) can be joined together to form a block copolymer molecule 220 in an ABAB . . . sequence; the smaller B blocks are bonded to one another to form B blocks with molecular weights similar to the A blocks. The total molecular weight of the molecule 220 is greater than about 100,000 Daltons.

As shown in FIG. 2C, the block copolymer molecules 220 can self-assemble to form a domain structure 230. For clarity, a few individual block copolymer molecules are labeled as 220. Thus the overall material has a lamellar domain structure with alternating domains of A (structural) material and B (conductive) material. The domain size is determined by the molecular weights of the A and B blocks and is independent of the molecular weight of the entire chain, yielding a much smaller domain size than the one shown in FIG. 1B, while having a similar or much larger molecular weight.

Figure 3A:
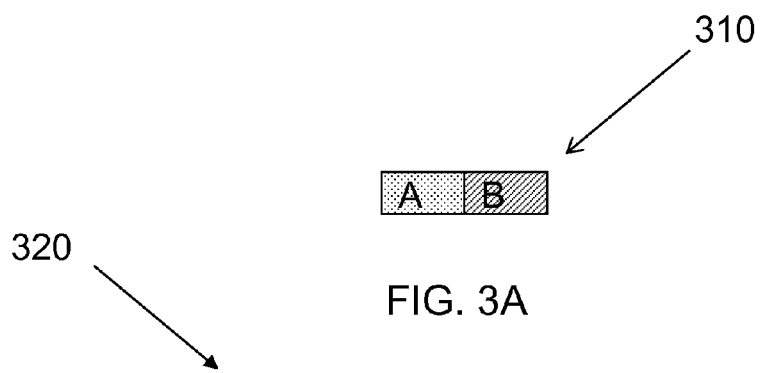
FIG. 3A is a schematic illustration of a low molecular weight diblock copolymer molecule that has small blocks.
Figure 3B:
FIG. 3B is a schematic illustration of a high molecular weight block copolymer molecule made by stringing together the block copolymer molecules shown in FIG. 3A.

FIG. 3A is a schematic illustration of a block copolymer molecule 310 that has been made using the process described herein, according to an embodiment of the invention. The molecule 310 is a very small diblock copolymer chain that has a block A (structural) attached to a block B (conductive) of a similar size. Block A and block B each has a molecular weight between about 500 and 10,000 Daltons. As shown in FIG. 3B, multiple blocks (e.g., more than five) can be joined together to form a block copolymer molecule 320 in an ABAB . . . sequence with a molecular weight greater than about 100,000.

Figure 3C:
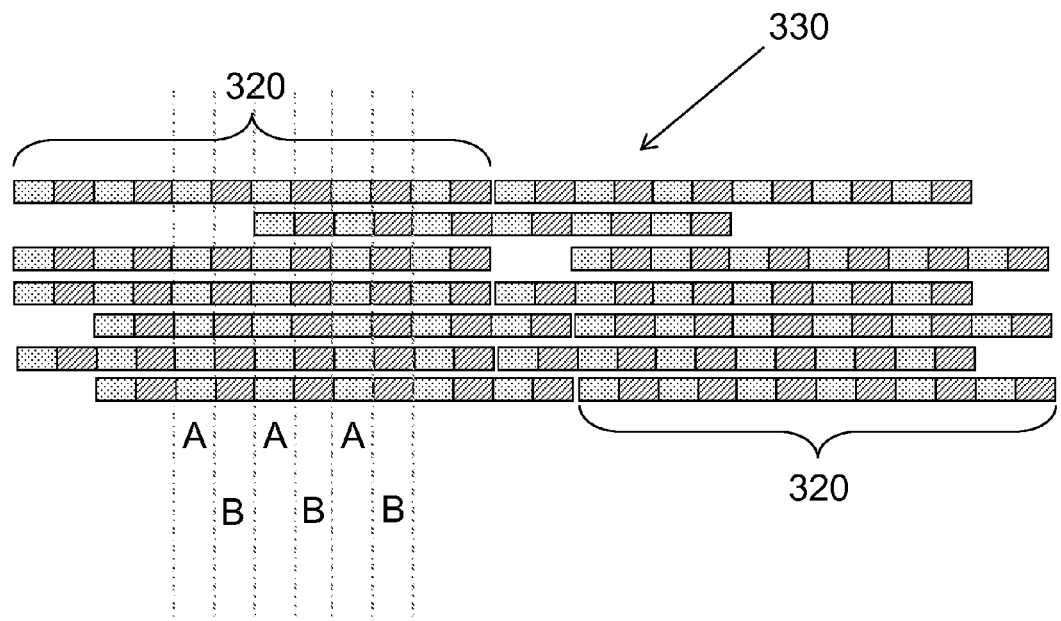
FIG. 3C is a schematic illustration of a high molecular weight block copolymer material that is made from the molecules in FIG. 3B and has small domains despite having high molecular weight, according to an embodiment of the invention.

As shown in FIG. 3C, the block copolymer molecules 320 can self-assemble to form a domain structure 330. For clarity, a few individual block copolymer molecules are labeled as 320. Thus the overall material has a lamellar domain structure with alternating domains of A (structural) material and B (conductive) material. The domain sizes are determined by the molecular weights of the A and B blocks and are independent of the molecular weight of the entire chain, yielding a much smaller domain size than the one shown in FIG. 1B, while having a similar or much larger molecular weight.

FIG. 4A is a schematic illustration of a block copolymer molecule 410 that has been made using the process described herein, according to an embodiment of the invention. The molecule 410 is a very small block copolymer chain that has a block A (structural) attached to a block B (conductive), which, in turn, is attached to a block C, which provides some other desirable property to the material such as crosslinking, increased polarity, or specific chemical binding. Block A, block B, and block C each has a molecular weight between about 500 and 10,000 Daltons. As shown in FIG. 4B, multiple blocks (e.g., more than five) can be joined together in an ABCBABCBA . . . sequence to form a block copolymer molecule 420 with a molecular weight greater than about 100,000 Daltons.

Figure 5A:
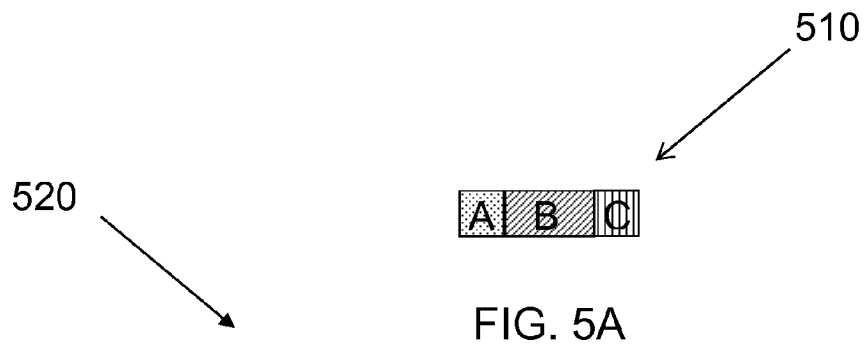
FIG. 5A is a schematic illustration of a low molecular weight triblock copolymer molecule that has small blocks.
Figure 5B:
FIG. 5B is a schematic illustration of a high molecular weight block copolymer molecule made by stringing together the block copolymer molecules shown in FIG. 5A.

As shown in FIG. 4C, the block copolymer molecules 420 can self-assemble to form a domain structure 430. The overall material has a lamellar domain structure with alternating domains of A (structural) material, B (conductive) material, and C (other desirable properties) material. The domain sizes are determined by the molecular weights of the A, B, and C blocks and are independent of the molecular weight of the entire chain, yielding a much smaller domain size than the one shown in FIG. 1B, while having a similar or much larger molecular weight FIG. 5A is a schematic illustration of a block copolymer molecule 510 that has been made using the process described herein, according to an embodiment of the invention. The molecule 510 is a very small block copolymer chain that has a block B (conductive) attached to smaller blocks A (structural) and C (other useful properties) on either side. Block B has a molecular weight between about 500 and 10,000 Daltons. Each smaller block A and C has a molecular weight between about 250 and 5,000 Daltons. As shown in FIG. 5B, multiple blocks (e.g., more than five) can be joined together in an ABCBABCBA . . . sequence. The smaller A blocks are bonded to one another to form A blocks with molecular weights similar to the B blocks, and the smaller C blocks are bonded to one another to form C blocks with molecular weights similar to the B blocks. The total molecular weight of the molecule 520 is greater than about 100,000 Daltons.

Figure 5C:
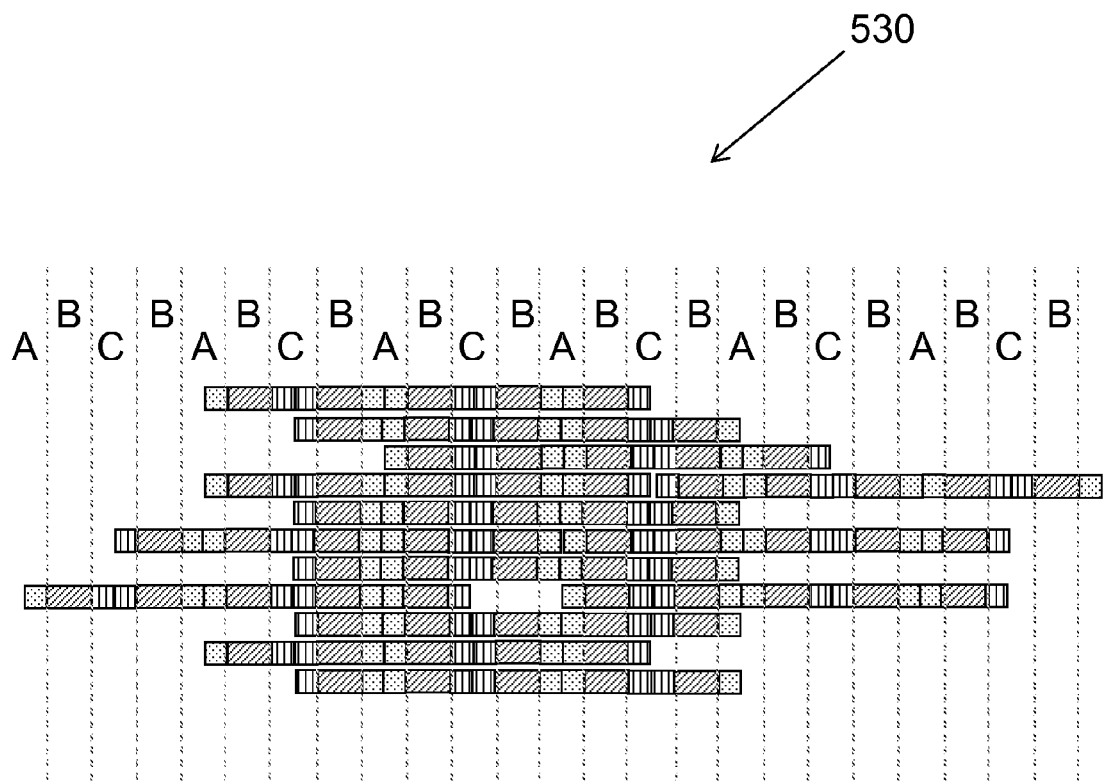
FIG. 5C is a schematic illustration of a high molecular weight block copolymer material that is made from the molecules in FIG. 5B and has small domains despite having high molecular weight, according to an embodiment of the invention.

As shown in FIG. 5C, the block copolymer molecules 520 can self-assemble to form a domain structure 530. The overall material has a lamellar domain structure with alternating domains of A (structural) material, B (conductive) material, and C (other useful properties) material. The domain sizes are determined by the molecular weights of the A, B, and C blocks, and are independent of the molecular weight of the entire chain, yielding a much smaller domain size than the one shown in FIG. 1B, while having a similar or much larger molecular weight.

The small domain sizes as shown in FIGS. 2C, 3C, 4C, and 5C comprise large molecular weight block copolymer electrolytes with small domain size and poor long range alignment. The structural blocks offer excellent protection against formation of dendrites during cycling against lithium in an electrochemical cell, while the poor long range alignment results in higher conductivities than previously reported for other block copolymer electrolytes. See, for example, Singh, et al, "Effect of Molecular Weight on the Mechanical and Electrical Properties of Block Copolymer Electrolytes," Macromolecules 2007, 40, 4578-4585. In addition to higher conductivity, these materials can be more easily synthesized because of less stringent requirements on the purity level of the reagents.

Choosing appropriate polymers for the block copolymers described above is important in order to achieve desired electrolyte properties. In one embodiment, a conductive polymer (1) exhibits ionic conductivity of at least $10^{-5}$ cm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, a structural material has a modulus in excess of $1\times10^5$ Pa at electrochemical cell operating temperatures. In one embodiment, a third polymer (1) is rubbery; and (2) has a glass transition temperature lower than operating and processing temperatures. It is useful if all materials are mutually immiscible.

In one embodiment of the invention, the conductive block can be made of a linear or branched polymer. Conductive linear or branched polymers that can be used in the conductive phase include, but are not limited to, polyethers, polyamines, polyimides, polyamides, alkyl carbonates, polynitriles, poly phosphorous esters and combinations thereof. The conductive linear or branched polymers can also be used in combination with polysiloxanes, polyphosphazines, polyolefins, and/or polydienes to form the conductive phase.

In another exemplary embodiment, the conductive block is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, poly phosphorous esters other polar groups, and combinations thereof.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural block can be made of polymers such as polystyrene, hydrogenated polystyrene, polymethacrylate, poly(methyl methacrylate), polyvinylpyridine, polyvinylcyclohexane, polyimide, polyamide, polypropylene, poly(2,6-dimethyl-1,4-phenylene oxide) (PXE), polyolefins, poly(t-butyl vinyl ether), poly (cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

The block copolymer electrolyte disclosed herein offers important advantages over previous block copolymer electrolytes. The synthesis of the disclosed block copolymer electrolyte is less susceptible to small impurities found in monomers commonly used to grow polymers than are previous block copolymers. The electrolyte also has higher conductivity and better dendrite suppression than previous block copolymer electrolytes made with similar reagents.

In one embodiment of the invention, a method of synthesizing a block copolymer electrolyte with small domains is provided. The steps of the method include a) forming individual block copolymer chains of type ABA with molecular weights between about 1000 and 20,000 Daltons; b) allowing the individual block copolymer chains of type ABA to join together to form larger molecules of type ABABABA . . . with molecular weights greater than about 100,000 Daltons; and c) allowing the larger molecules to self-assemble to form a lamellar domain structure wherein the large molecules each span a plurality of domains.

In another embodiment of the invention, a method of synthesizing a block copolymer electrolyte is provided. The steps of the method include a) forming individual block copolymer chains with a first ionically conductive block and a second structural block, wherein each block has a molecular weight between about 250 and 10,000 Daltons; b) allowing the individual block copolymer chains to join together to form larger block copolymer molecules with molecular weights greater than about 100,000 Daltons; and c) allowing the larger molecules to self-assemble to form a lamellar domain structure wherein each large molecule spans a plurality of domains. In some arrangements, a third block can be added to the individual block copolymer chains in step a), wherein the third block that has desirable properties and a molecular weight between about 250 and 10,000 Daltons.

EXAMPLE

The following example provides details relating to composition, fabrication and performance characteristics of block copolymer electrolytes in accordance with the present invention. It should be understood the following is representative only, and that the invention is not limited by the detail set forth in this description of PEO-PS multiblock synthesis.

THF Purification

Tetrahydrofuran (THF), purchased from VWR, was first purified by stirring on freshly ground calcium hydride for at least eight hours in a long neck flask attached to a vacuum line. The mixture was frozen using liquid nitrogen and degassed under vacuum obtained from a mechanical pump (~3×10$^{-3}$ torr). The THF was thawed and then refrozen and degassed two more times. This process ensured that the majority of the water and oxygen were removed from the THF, and that the THF could then be safely distilled. The THF was distilled out of the calcium hydride onto sodium metal using dry ice/isopropanol as the coolant on the sodium stage. After distillation, the THF was stirred on the sodium for at least eight hours and degassed thoroughly prior to use.

Styrene Purification

Styrene was purchased from Aldrich and stored in a freezer prior to use. The styrene was poured into a flask along with dibutylmagnesium (1.0 M in heptane) in a ratio of 10 to 1 and attached to a vacuum line where it was degassed. The mixture was then frozen with liquid nitrogen and degassed three times with the vacuum obtained from the mechanical pump. The styrene was stirred on the dibutylmagnesium for at least eight hours and thoroughly degassed prior to use.

Ethylene Oxide Purification

Ethylene oxide, purchased from Praxair, was transferred from its gas cylinder to the vacuum line via a regulator and plastic tube connected to a 24/40 port. Ethylene oxide is a gas at room temperature, and at atmospheric pressure it condenses at 11° C. It was condensed into a long neck flask containing freshly ground calcium hydride using dry ice/isopropanol as the coolant. After condensation, the ethylene oxide was frozen and degassed as described above to eliminate any air. The ethylene oxide was stirred for a minimum of eight hours on the calcium hydride while packed in dry ice/isopropanol. A solution of toluene and n-Butyllithium (n-BuLi) was mixed in a glove box and frozen and degassed as described above. The ethylene oxide was then distilled, into the toluene/n-BuLi purification mixture with dry ice as a coolant in order to provide a heat sink for any ethylene oxide reaction that may occur. The ethylene oxide was then stirred in this purification solution for at least eight hours and degassed before use.

Potassium Napthelene Initiator

Potassium napthelene (0.1 M) in THF was made by weighing out 6.4085 g napthelene and 2.93 g potassium (1.5× excess) and adding them together in 500 mL of purified THF. The solution was stirred for at least 24 hours.

Synthesis:

To make a polymer with a polystyrene block around 2,500 g/mol, polystyrene was synthesized by distilling 125 mL of styrene from the purification stage into a graduated ampoule and then into a reacting vessel that contained THF. While on a vacuum line, the reactor was cooled using dry ice/isopropyl alcohol. As argon was blown through the reactor, the reaction was initiated by adding 9.25 mL of 0.1 M potassium napthelene initiator solution. A characteristic red "living" polymer mixture was obtained upon completion after about one hour. The mixture was stirred continuously during the reaction to ensure uniform mixing of the monomer. The reactor was then opened under argon flow to take a sample of the styrene polymer for gel permeation chromatography (GPC) characterization to ensure that the desired molecular weight had been obtained.

Once the styrene reaction was complete and the molecular weights had been verified, the reactor was degassed on a vacuum line, and 150 mL of purified ethylene oxide was vacuum-transferred into the reactor under dry ice/isopropyl alcohol coolant. Once the ethylene oxide was transferred, the reactor was closed and allowed to warm up to room temperature. When the reactor reached room temperature it was heated at 40° C. for 2 days.

After 2 days of ethylene oxide propagation at 40° C., the reactor was brought into a glove box, and 18.5 mL of 0.5M dibromoxylene solution was added. While stirring for 1 day at 40° C., the reaction linked together the triblock copolymers to form high molecular weight block copolymers as depicted in FIG. 2B.

After the reaction was complete, the solution was precipitated into hexanes and vacuum dried. Once the material was dry, a final GPC sample was taken to determine molecular weight, and the overall composition was determined using proton nuclear magnetic resonance.

This invention has been described herein in considerable detail to provide those skilled in the art with information relevant to apply the novel principles and to construct and use such specialized components as are required. However, it is to be understood that the invention can be carried out by different equipment, materials and electrolytes, and that various modifications, both as to the equipment and operating procedures, can be accomplished without departing from the scope of the invention itself.

We claim:

1. A block copolymer electrolyte, comprising:
a plurality of linear block copolymer molecules comprising first linear, ionically-conductive polymer blocks and second linear polymer blocks, the block copolymer molecules having molecular weights greater than about 100,000 Daltons, each block copolymer molecule spanning a plurality of contiguous lamellar domains wherein;
a first lamellar domain comprises a plurality of first linear, ionically-conductive polymer blocks having molecular weights between about 500 and 10,000 Daltons and a salt, the first domain forming a conductive portion of the electrolyte material; and
a second lamellar domain comprises a plurality of second linear polymer blocks having molecular weights between about 500 and 10,000 Daltons, the second domain adjacent to the first lamellar domain and forming a structural portion of the electrolyte material;
wherein the block copolymer molecules each contains more than five blocks.

2. The electrolyte of claim 1 wherein the first linear polymer block comprises one or more selected from the group consisting of polyethers, polyamines, polyimides, polyamides, alkyl carbonates, polynitriles, oxyphosphorus-containing polymers, and linear or branched polymers in combination with polysiloxanes, polyphosphazines, polyolefins, and/or polydienes, and combinations thereof.

3. The electrolyte of claim 2 wherein the first linear polymer block comprises polyethylene oxide (PEO).

4. The electrolyte of claim 3 wherein the PEO is synthesized from ethylene oxide that has a purity between about 98 and 99.5%.

5. The electrolyte of claim 1 wherein the second linear polymer block comprises one or more selected from the group consisting of polystyrene, hydrogenated polystyrene, polymethacrylate, poly(methyl methacrylate), polyvinylpyridine, polyvinylcyclohexane, polyimide, polyamide, polypropylene, poly(2,6-dimethyl-1,4-phenylene oxide) (PXE), polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, and copolymers that contain styrene, methacrylate, or vinylpyridine.

6. The electrolyte of claim 5 wherein the second linear polymer block comprises polystyrene.

7. The electrolyte of claim 6 wherein the polystyrene is synthesized from styrene that has a purity between about 95 and 99.5%.

8. The electrolyte of claim 1 wherein the block copolymer electrolyte has an ionic conductivity of at least $1 \times 10^{-5}$ Scm$^{-1}$ at 90° C.

9. A method of synthesizing a block copolymer electrolyte, comprising the steps of:
a) forming individual block copolymer chains of type ABA with molecular weights between about 1000 and 20,000 Daltons;
b) allowing the individual block copolymer chains of type ABA to join together to form larger block copolymer molecules of type ABAB . . . with molecular weights greater than about 100,000 Daltons; and
c) allowing the larger block copolymer molecules to self-assemble to form a lamellar domain structure wherein the larger block copolymer molecules each spans a plurality of domains.

10. A method of synthesizing a block copolymer electrolyte, comprising:
a) forming individual block copolymer chains with a first ionically conductive block and a second structural block, wherein each block has a molecular weight between about 250 and 10,000 Daltons;
b) allowing the individual block copolymer chains to join together to form larger block copolymer molecules with molecular weights greater than about 100,000 Daltons; and
c) allowing the larger molecules to self-assemble to form a lamellar domain structure wherein each larger molecule spans a plurality of domains.

11. The method of claim 10 further comprising:
adding a third block to the individual block copolymer chains in step a), wherein the third block has a molecular weight between about 250 and 10,000 Daltons.

12. The method of claim 11 wherein the third block provides a property selected from the group consisting of crosslinking, increased polarity, specific chemical binding, and rubberiness.

* * * * *